May 17, 1949.  T. B. RANKIN  2,470,446
HEATING AND COOKING APPARATUS
Filed March 31, 1947  2 Sheets-Sheet 1
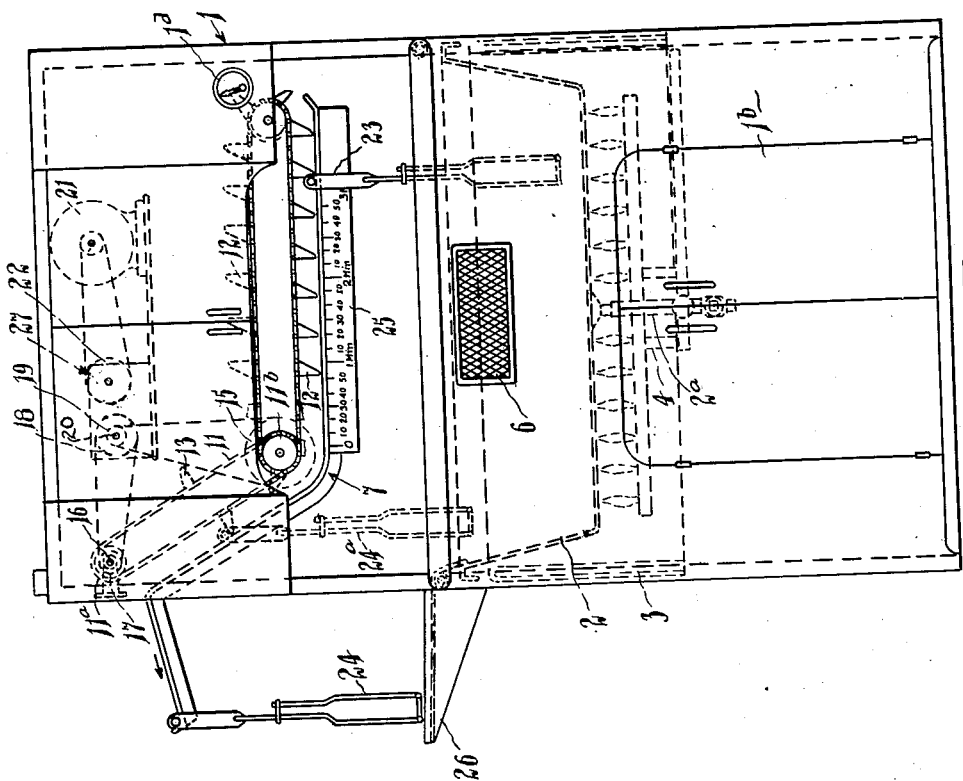
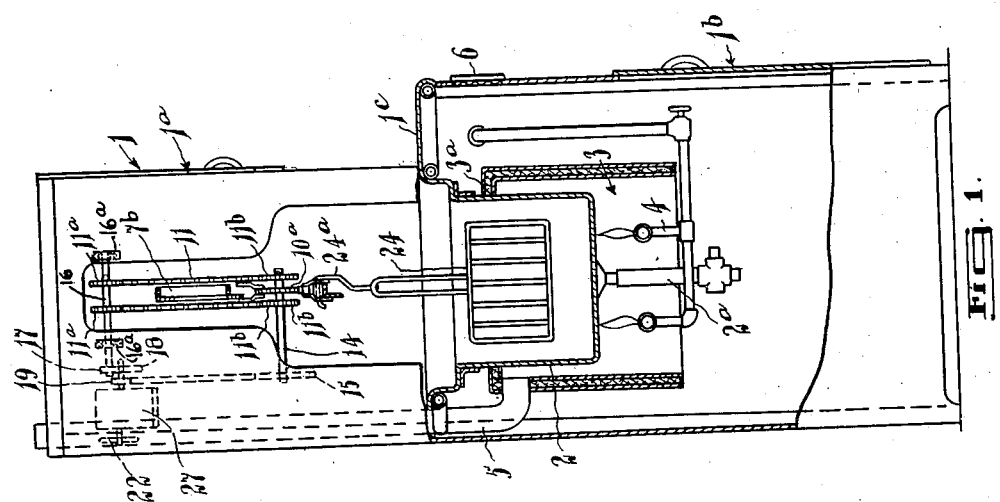
INVENTOR
THOMAS B. RANKIN
ATT'y May 17, 1949. T. B. RANKIN 2,470,446
HEATING AND COOKING APPARATUS
Filed March 31, 1947 2 Sheets-Sheet 2

INVENTOR
THOMAS B. RANKIN
ATT'Y

Patented May 17, 1949

2,470,446

UNITED STATES PATENT OFFICE 2,470,446

HEATING AND COOKING APPARATUS

Thomas B. Rankin, Brantford, Ontario, Canada

Application March 31, 1947, Serial No. 738,466

10 Claims. (Cl. 99—407)

This invention relates to new and useful improvements in a heating and cooking apparatus, particularly of the deep fat frying type.

An object of this invention is to provide means in an apparatus of this character for more effectively and conveniently regulating the duration of the heating or cooking operation.

Another object of this invention is to provide means for heating several kinds of food, each for its own most suitable length of time, either individually or simultaneously.

A further object of this invention is to provide means for continuously passing the material to be heated through a heating section at a relatively slow rate and for removing it from the heating section at a relatively greater rate, without interrupting the movement of the material.

A still further object of this invention is to provide an improved heating section for deep fat frying.

According to my invention I provide a heating apparatus including a heating section, suspending means for suspending the material to be heated in the heating section, means for passing the suspending means through the heating section at a relatively slow speed, and means for then removing the suspending means from the heating section at an increased speed without substantially interrupting the movement of the suspending means. I also provide a heating section comprising a tank, a chamber, and heating means positioned in the chamber; the chamber having its roof integral with the side walls of the tank, and having downwardly extending side walls with a flue in one side wall near the roof, and an open bottom; the tank extending substantially into the chamber and having its side walls spaced from the side walls of the chamber.

All of the foregoing and still further objects and advantages of the invention will become apparent from a study of the following specification, taken in conjunction with the accompanying drawings, wherein like characters of reference indicate corresponding parts throughout the several views and wherein:

Figure 1 is an end elevation of the apparatus with a portion of the end walls broken away;

Figure 2 is a front elevation of the apparatus;

Figure 3:
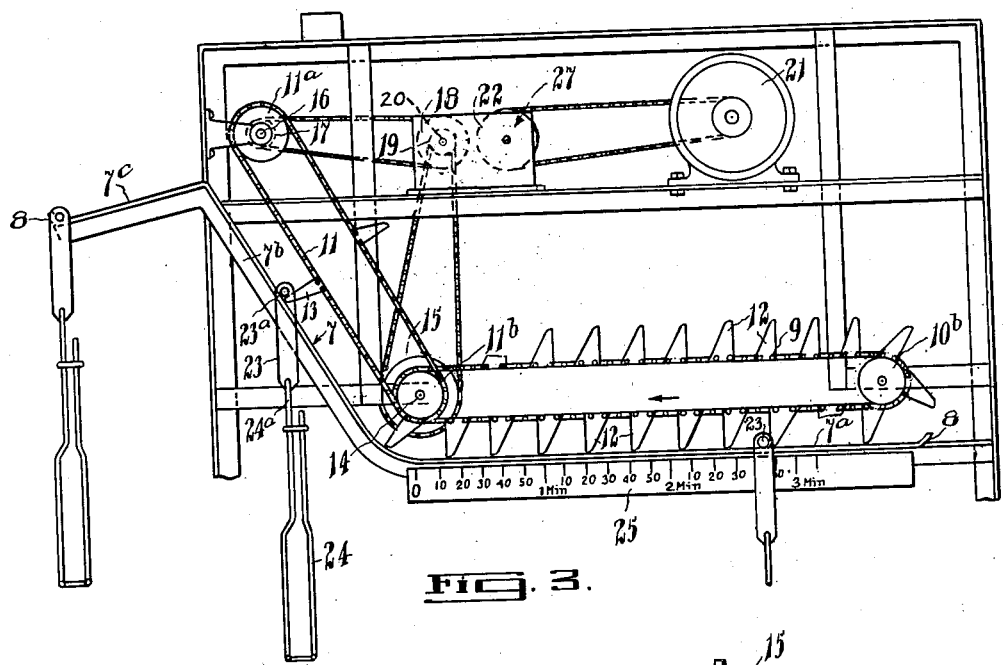
Figure 3 is a fragmentary, broken away elevation of the apparatus showing a conveyor and suspending means used therewith.

Referring to the drawings, a cabinet 1 built around a welded pipe frame comprises an upper section 1a and a lower wider section 1b, and is shown in detail in Figures 1 and 2 with the requisite doors, handles and other hardware.

In the lower part of cabinet 1 is mounted a metal tank 2, for holding cooking fats and the like, equipped with a valve-controlled drain 2a. Top wall 1c of cabinet section 1b and tank 2 seal off the interior of cabinet section 1b from the interior of cabinet section 1a. Extending downward from tank 2 is an insulated chamber 3 which is open at its bottom. Roof 3a of the chamber is integrally joined to the side walls of tank 2, so that tank 2 extends downwards into the chamber for a considerable distance. Positioned within chamber 3 are burners 4, which heat tank 2; these are suitably connected to a supply source. Connected to chamber 3, near its roof, is a fume pipe 5 which extends upwardly through cabinet section 1a to a suitable outlet. Cabinet section 1b has a grill 6 therein which serves as an air inlet and prevents the cabinet from warping. Other air inlets (not shown) are provided in the bottom of cabinet section 1b. The temperature of the cooking fat is controlled by a thermostat not shown in detail but indicated by a dial 1d.

The arrangement of tank 2 and insulated chamber 3 concentrates highly heated gases on a large surface area of tank 2 while reducing heat loss to a minimum. This permits rapidly raising the temperature of the fats in the tank to the desired level and the maintenance of this temperature level with a minimum of heat.

Referring now to the conveyor and the suspending means, shown particularly in Figures 1, 2 and 3, a track 7 made of angle iron is mounted above tank 2. The track may be considered as being in three sections, i. e. a straight section 7a extending the length of the tank, an upwardly extending section 7b having a curved part joining it to section 7a, and a downwardly extending section 7c joined to section 7b. Track 7 terminates in ridges or stops 8, 8.

Figures 4, 5:
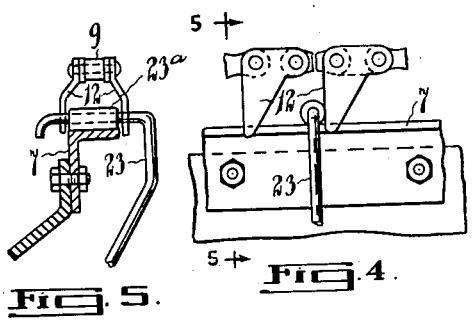
Figure 4 is a detail in elevation of the conveyor and suspending means.
Figure 5 is a section on line 5—5 of Figure 4.

Immediately above track section 7a, parallel thereto, is an endless conveyor chain 9 mounted on sprockets 10a and 10b. Immediately above track section 7b, parallel thereto, are two endless conveyor chains 11, 11 mounted close together on sprockets 11a, 11b and 11a, 11b, respectively. The conveyor chains are kept taut by means of self-tighteners or other suitable means well known in the art. Conveyor chain 9 has a series of outwardly extending lugs 12 riveted to it. These lugs are mounted opposite each other in pairs, as shown in Figure 5. Single-prong lugs 13 are mounted on each of conveyor chains 11, 11. The lugs on these chains are mounted directly opposite one another in pairs so as to co-operate in the same manner as the pairs of lugs or conveyor chain 9.

Figure 6:
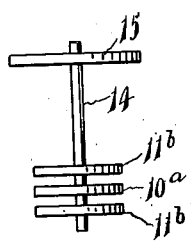
Figure 6 is a detail in plan showing a drive arrangement for the conveyor.

Referring particularly to Figure 6, sprocket 10a, the driving sprocket for conveyor chain 9, is keyed onto a shaft 14 which is driven by a sprocket 15 keyed thereto. Rotatably mounted on shaft 14 and to either side of sprocket 10a are sprockets 11b, 11b which are the driven or idler sprockets for conveyor chains 11, 11.

The driving sprockets 11a, 11a for conveyor chains 11, 11 are keyed to a shaft 16 which is driven in turn by a sprocket 17. The shaft is secured in the cabinet by bearings 16a, 16a. Driving sprockets 17 and 15 are in turn chain driven by sprockets 18 and 19, respectively, mounted on driving shaft 20 of a speed reducer 21. The speed reducer is operatively connected by a sprocket 22 to a motor 21. Through the interrelation of the sprockets conveyor chain 9 is driven at a much slower speed than conveyor chains 11, 11, for example at a speed ratio of 1:15.

Suspended from track 7 are handles 23. Each handle 23 has a roller bearing 23a adapted to roll on the track (see Figure 5). Open, grill-formed, hinged baskets 24 for holding food and the like, each having a hook portion 24a, are hooked onto handles 23. Mounted below and along track section 7a is a scale 25 calibrated in minutes and seconds. If desired the baskets may be covered with wire mesh or completely enclosed.

Secured to cabinet section 1a below track section 7c is a drain and fat return trap 26 for returning to tank 2 the fat carried over by the food baskets.

In use, tank 2 is filled to a desired level with fat or the like and heated by means of the burners 4. The temperature of the fat is maintained at a constant desired level by means of the thermostat indicated by dial 1d.

The food or the like to be heated or cooked is placed in basket 24, which is then suspended in the hot fat in tank 2 from handle 23 supported on track section 7a. By reference to scale 25, which is calibrated by experiment, the duration of the cooking is predetermined. Referring to the drawings, it is obvious that the further to the right the basket is placed on track section 7a, the longer it will remain in the hot fat. Where a plurality of portions of foods are to be cooked for different periods, they are simultaneously suspended in a plurality of baskets suspended at appropriate positions along scale 25. As appears from Figures 3 and 5, the pairs of lugs 12 on endless conveyor chain 9 slowly push the roller-mounted handles 23 along track section 7a. When the handles 23 reach the intersection of track section 7a with track section 7b, the lugs 13 on conveyor chains 11, 11, co-operating in pairs, without substantially interrupting the movement of the handles 23, take over, and quickly push the handles up the track section 7b. Conveyor chains 9 and 11, 11, are synchronised so that each handle 23 is cleared from the lug 12 pushing it before the said lug starts to reverse its direction of travel, and the handle is then pushed by lugs 13. When the handles reach the top of track section 7b they are released from lugs 13 and roll rapidly down track section 7c. The handles are arrested by stop 8, the baskets are disengaged by the operation and the cooked food removed for use.

The handles may then be immediately re-employed by replacing them on track section 7a and suspending therefrom other baskets containing food to be cooked.

It will be apparent that in the continuous process afforded by the heating and cooking apparatus according to my invention it is feasible to have numerous portions of food in every stage of cooking from raw to ready for use. The accurate temperature control minimizes fat absorption by the food and contamination of the cooking fat to flavours and odours, even though various foods are being cooked at the same time. The quick lift conveyor assures that the food will be cooked uniformly from top to bottom.

It is thought that the construction and use of the invention will be apparent from the above description of the various parts and their purpose. It is to be understood that the form of the invention herewith shown and described, is to be taken as a preferred example of the same, and that various changes in the shape, size and arrangement of parts may be resorted to, without departing from the spirit of the invention or the scope of the subjoined claims.

What I claim as my invention is:

1. In a heating apparatus, a heating section, a track comprising a first section mounted over the heating section and a second section extending beyond the heating section, suspending means supported on the track for suspending the material to be heated in the heating section, endless conveyors including lugs, the lugs being adapted to move the suspending means along the track, one conveyor being mounted adjacent the first track section and another conveyor being mounted adjacent the second track section, the first conveyor being adapted to move the suspending means to the end of the first track section and the second conveyor being adapted to then move the suspending means along the second track section.

2. In a heating apparatus, a heating section, a track comprising a first section mounted over the heating section and a second section extending beyond the heating section, suspending means supported on the track for suspending the material to be heated in the heating section, endless conveyors including lugs, the lugs being adapted to move the suspending means along the track, one conveyor being mounted adjacent the first track section and another conveyor being mounted adjacent the second track section, the first conveyor being adapted to move the suspending means at a relatively slow speed to the end of the first track section and the second conveyor being adapted to then move the suspending means at an increased speed along the second track section.

3. In a heating apparatus, a heating section, a track comprising a first section mounted over the heating section, a second section extending beyond the heating section and extending upwards with respect to the first section, and a third section extending downwardly from the second section, suspending means supported on the track for suspending the material to be heated in the heating section, and endless conveyors including lugs, the lugs being adapted to move the suspending means along the track, one conveyor being mounted adjacent the first track section and another conveyor being mounted adjacent the second track section, the first conveyor being adapted to move the suspending means to the end of the first track section and the second conveyor being adapted to then move the suspending means along the second track section, the suspending means being then carried along the third section by gravity.

4. In a heating apparatus, a heating section, a track comprising a first section mounted over the heating section, a second section extending beyond the heating section and upwards with respect to the first section, and a third section extending downwardly from the second section, suspending means supported on the track for suspending the material to be heated in the heating section, and endless conveyors including lugs, the lugs being adapted to move the suspending means along the track, one conveyor being mounted adjacent the first track section and another conveyor being mounted adjacent the second track section, the first conveyor being adapted to move the suspending means at a relatively slow speed to the end of the first track section, and the second conveyor being adapted to then move the suspending means at an increased speed along the second track section, the suspending means being then carried along the third section by gravity.

5. In a heating apparatus, a heating section, a track comprising a first section mounted over the heating section and a second section extending beyond the heating section, suspending means supported on the track for suspending the material to be heated in the heating section, endless conveyors including lugs, the lugs being adapted to move the suspending means along the track, one conveyor being mounted adjacent the first track section and another conveyor being mounted adjacent the second track section, and a rotatable shaft positioned adjacent the junction of the track sections, each of said conveyors including a sprocket mounted on the said shaft, the first conveyor being adapted to move the suspending means to the end of the first track section and the second conveyor being adapted to then move the suspending means along the second track without substantially interrupting the movement of the suspending means.

6. In a heating apparatus, a heating section, a track comprising a first section mounted over the heating section and a second section extending beyond the heating section, suspending means supported on the track for suspending the material to be heated in the heating section, endless conveyors including lugs, the lugs being adapted to move the suspending means along the track, one conveyor being mounted above the first track section and another conveyor being mounted above the second track section, and a rotatable shaft positioned adjacent the junction of the track sections, each of said conveyors including a sprocket mounted on the shaft, the first conveyor being driven at a relatively slow speed to move the suspending means to the end of the first track section and the second conveyor being driven at a greater speed to then move the suspending means along the second track without substantially interrupting the movement of the suspending means.

7. In a heating apparatus, a heating section, a track comprising a first section mounted over the heating section and a second section extending beyond the heating section, suspending means supported on the track for suspending the material to be heated in the heating section, endless conveyors including lugs, the lugs being adapted to move the suspending means along the track, one conveyor being mounted adjacent the first track section and another conveyor being mounted adjacent the second track section, and a rotatable shaft positioned adjacent the junction of the track sections, each of said conveyors comprising a sprocket mounted on the shaft, one of said sprockets being a driver for one conveyor and the other of said sprockets being an idler for the other conveyor, the first conveyor being adapted to move the suspending means to the end of the first track section and the second conveyor being adapted to then move the suspending means along the second track without substantially interrupting the movement of the suspending means.

8. In a heating apparatus, a heating section, a track comprising a first section mounted over the heating section and a second section extending beyond the heating section, suspending means supported on the track for suspending the material to be heated in the heating section, endless conveyors, the endless conveyors including lugs adapted to move the suspending means along the track, one conveyor being mounted adjacent the first track section and another conveyor being mounted adjacent the second track section, and a shaft positioned adjacent the junction of the track sections, each of said conveyors including a sprocket mounted on the shaft, one of said sprockets being a driver for one conveyor and the other of said sprockets being an idler for the other conveyor, a driving sprocket for the said other conveyor, means for driving the driving sprockets of the conveyors at different speeds, the first conveyor being driven at a relatively slow speed to move the suspending means to the end of the first track section and the second conveyor being driven at a relatively greater speed to then move the suspending means along the second track section without substantially interrupting the movement of the suspending means.

9. In a heating apparatus, a heating section, a track comprising a first section mounted over the heating section and a second section extending beyond the heating section, suspending means supported on the track for suspending the material to be heated in the heating section, endless conveyors including lugs, the lugs being adapted to move the suspending means along the track, one conveyor being mounted adjacent the first track section and another conveyor being mounted adjacent the second track section, the first conveyor being adapted to move the suspending means to the end of the first track section and the second conveyor being adapted to then move the suspending means along the second track section, the conveyors being synchronised so that the suspending means is cleared from the lug of the first conveyor then pushing the said suspending means before the lug starts to reverse its direction of travel and is then acted upon by the lug of the other conveyor.

10. In a heating apparatus, a heating section, a track comprising a first section mounted over the heating section and a second section extending beyond the heating section, suspending means supported on the track for suspending the material to be heated in the heating section, endless conveyors, the endless conveyors including lugs adapted to move the suspending means along the track, one conveyor being rounted adjacent the first track section and another conveyor being mounted adjacent the second track section, and a shaft positioned adjacent the junction of the track sections, each of said conveyors including a sprocket mounted on the shaft, one of said sprockets being a driver for one conveyor and the other of said sprockets being an idler for the other conveyor, a driving sprocket for the said other conveyor, means for driving the driving sprockets of the conveyors at different speeds, the first conveyor being driven at a relatively slow speed to move the suspending means to the end of the first track section and the second conveyor being driven at a relatively greater speed to then move the suspending means along the second track section without substantially interrupting the movement of the suspending means, the conveyors being synchronised so that the suspending means is cleared from the lug of the first conveyor before the lug starts to reverse its direction of travel and is then acted upon by the lug of the other conveyor.

THOMAS B. RANKIN.

REFERENCES CITED

The following references are of record in the file of this patent:

UNITED STATES PATENTS

| Number | Name | Date |
| --- | --- | --- |
| 1,301,997 | Becker | Apr. 29, 1919 |
| 1,317,745 | Watson et al. | Oct. 7, 1919 |
| 1,919,185 | Chapman | July 25, 1933 |
| 2,338,964 | Pappas | Jan. 11, 1944 |
| 2,452,657 | Hooper | Nov. 2, 1948 |

FOREIGN PATENTS

| Number | Country | Date |
| --- | --- | --- |
| 553,951 | Germany | June 16, 1932 |